US012786746B2

(12) United States Patent
Yip et al.

(10) Patent No.: US 12,786,746 B2
(45) Date of Patent: Nov. 3, 2026

(54) METHOD AND APPARATUS FOR PROVIDING AI/ML MEDIA SERVICES

(71) Applicant: Samsung Electronics Co., Ltd., Gyeonggi-do (KR)

(72) Inventors: Eric Yip, Gyeonggi-do (KR); Hyunkoo Yang, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 278 days.

(21) Appl. No.: 18/486,666

(22) Filed: Oct. 13, 2023

(65) Prior Publication Data

US 2024/0129757 A1 Apr. 18, 2024

(30) Foreign Application Priority Data

Oct. 13, 2022 (KR) ........................ 10-2022-0131360

(51) Int. Cl.
*H04W 24/02* (2009.01)
*H04L 41/16* (2022.01)

(52) U.S. Cl.
CPC ............. *H04W 24/02* (2013.01); *H04L 41/16* (2013.01)

(58) Field of Classification Search
CPC .... H04W 24/02; H04L 41/16; H04L 65/1016; H04L 65/1069; H04L 65/1104; H04L 65/764; H04L 65/1101; H04L 65/765; G06N 20/00
See application file for complete search history.

(56) References Cited

U.S. PATENT DOCUMENTS

| | | | | |
|---|---|---|---|---|
| 2013/0021998 | A1* | 1/2013 | Shatsky ................ | H04W 72/04 370/329 |
| 2014/0029477 | A1* | 1/2014 | Suryavanshi ........... | H04W 4/16 370/328 |
| 2019/0141084 | A1 | 5/2019 | Hart et al. | |
| 2022/0021864 | A1 | 1/2022 | Mate et al. | |
| 2022/0095131 | A1* | 3/2022 | Surana ................... | G06N 20/00 |

(Continued)

FOREIGN PATENT DOCUMENTS

KR 1020220100029 7/2022

OTHER PUBLICATIONS

3GPP TS 26.114 V17.4.0, 3rd Generation Partnership Project; Technical Specification Group Services and System Aspects; IP Multimedia Subsystem (IMS); Multimedia Telephony; Media Handling and interaction (Release 17) (Year: 2022).*

(Continued)

*Primary Examiner* — Andrew W Chriss
(74) *Attorney, Agent, or Firm* — The Farrell Law Firm, P.C.

(57) ABSTRACT

The disclosure relates to a 5G or 6G communication system for supporting a higher data transmission rate. Methods and apparatuses in provided in which a session description protocol (SDP) offer including a list of artificial intelligence (AI) models is received from a media resource function (MRF) entity. At least one AI model is identified from the list for outputting at least one result using first media data, based on a type of the first media data and a media service in which the at least one result is used. An SDP response is transmitted to the MRF entity, requesting the at least one AI model as a response to the SDP offer, and the first media data is processed based on the at least one AI model received from the MRF entity.

20 Claims, 18 Drawing Sheets

(56) References Cited

U.S. PATENT DOCUMENTS

| | | | | |
|---|---|---|---|---|
| 2022/0286485 | A1 | 9/2022 | Naidu et al. | |
| 2022/0321926 | A1 | 10/2022 | Yip et al. | |
| 2022/0328878 | A1 | 10/2022 | Sawa et al. | |
| 2023/0403684 | A1* | 12/2023 | Fu | H04W 28/02 |

OTHER PUBLICATIONS

International Search Report dated Jan. 24, 2024 issued in counterpart application No. PCT/KR2023/015870, 7 pages.

* cited by examiner

METHOD AND APPARATUS FOR PROVIDING AI/ML MEDIA SERVICES

CROSS-REFERENCE TO RELATED APPLICATION(S)

This application is based on and claims priority under 35 U.S.C. § 119 to Korean Patent Application No. 10-2022-0131360, filed on Oct. 13, 2022, in the Korean Intellectual Property Office, the disclosure of which is incorporated herein by reference in its entirety.

BACKGROUND

1. Field

The present disclosure relates generally to a wireless communication system, and more particularly, to a method and an apparatus for providing artificial intelligence (AI)/machine learning (ML) media services.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing AI and ML, AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

SUMMARY

According to an embodiment, a method performed by a user equipment (UE) in a wireless communication system is provided. The method includes receiving, from a media resource function (MRF) entity, a session description protocol (SDP) offer including a list of AI models, identifying at least one AI model from the list for outputting at least one result using first media data, based on a type of the first media data and a media service in which the at least one result is used, transmitting, to the MRF entity, an SDP response for requesting the at least one AI model as a response to the SDP offer and processing the first media data based on the at least one AI model received from the MRF entity.

According to an embodiment, a UE in a wireless communication system is provided. The UE includes a transceiver and a controller coupled with the transceiver. The controller is configured to receive, from an MRF entity, an SDP offer including a list of AI models, identify at least one AI model from the list for outputting at least one result using first media data, based on a type of the first media data and a media service in which the at least one result is used, transmit, to the MRF entity, an SDP response for requesting the at least one AI model as a response to the SDP offer, and process the first media data based on the at least one AI model received from the MRF entity.

According to an embodiment, a method performed by an MRF entity in a wireless communication system is provided. The method comprises transmitting, to a UE, an SDP offer including a list of AI models, and receiving, from the UE, an SDP response for requesting at least one AI model from the list for outputting at least one result using first media data as a response to the SDP offer. The at least one AI model is based on a type of the first media data and a media service in which the at least one result is used.

According to an embodiment, an MRF entity in a wireless communication system is provided. The MRF entity includes a transceiver and a controller coupled with the transceiver. The controller is configured to transmit, to a UE, an SDP offer including a list of AI models, and receive, from the UE, an SDP response for requesting at least one AI model from the list for outputting at least one result using first media data as a response to the SDP offer. The at least one AI model is based on a type of the first media data and a media service in which the at least one result is used.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
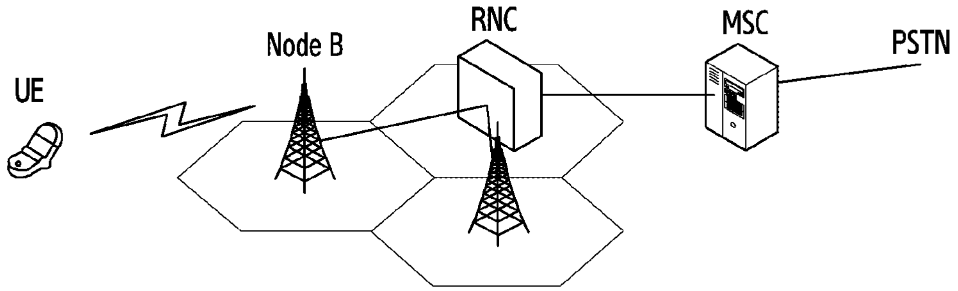
FIG. 1 is a diagram illustrating a of wireless communication system, according to an embodiment.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

Singular forms “a,” “an,” and “the” include plural referents unless the context clearly dictates otherwise. Thus, for example, reference to “a component surface” includes reference to one or more of such surfaces.

The term “include” or “may include” refers to the existence of a corresponding disclosed function, operation or component which can be used in various embodiments of the present disclosure and does not limit one or more additional functions, operations, or components. The terms such as “include” and/or “have” may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the present disclosure includes any or all of combinations of listed words. For example, the expression "A or B" may include A, may include B, or may include both A and B.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

Embodiments of the disclosure relate to 5G network systems for multimedia, architectures and procedures for AI/ML model transfer and delivery over 5G, AI/ML model transfer and delivery over 5G for AI enhanced multimedia services, AI/ML model selection and transfer over IMS, and AI/ML enhanced conversational services over IMS. Embodiments also relate to SDP signaling for AI/ML model delivery and AI multimedia, and time synchronization of an AI model (including AI data) and media data (video and audio) for AI media conversation/streaming services.

AI is a general concept defining the capability of a system to act based on two major conditions. The first condition is the context in which a task is performed (i.e., the value or state of different input parameters). The second condition is the past experience of achieving the same task with different parameter values and the record of potential success with each parameter value.

ML is often described as a subset of AI, in which an application has the capacity to learn from the past experience. This learning feature usually starts with an initial training phase to ensure a minimum level of performance when it is placed into service.

Recently, AI/ML has been introduced and generalized in media related applications, ranging from applications such as image classification, speech/face recognition, to more applications such as video quality enhancement. Additionally, AI applications for augmented reality (AR)/virtual reality (VR) has become ever more popular, especially in applications regarding the enhancement of photo-realistic avatars related to facial three-dimensional (3D) modelling or similar applications. As research into this field matures, more and more complex AI/ML-based applications requiring higher computational processing can be expected. Such processing involves dealing with significant amounts of data not only for the inputs and outputs into the AI/ML models, but also for the increasing data size and complexity of the AI/ML models themselves. This growing amount of AI/ML related data, together with a need for supporting processing intensive mobile applications (e.g., VR, AR/mixed reality (MR), gaming, and more), highlights the importance of handling certain aspects of AI/ML processing by the server over 5G system, in order to meet the required latency requirements of various applications.

Current implementations of AWL are enabled via applications without compatibility with other market solutions. In order to support AI/ML for multimedia applications over 5G, AI/ML models should support compatibility between UE devices and application providers from different mobile network operators (MNOs). AI/ML model delivery for AI/ML media services should support media context, UE status, and network status based selection and delivery of the AI/ML model. The processing power of UE devices is also a limitation for AI/ML media services, since next generation media services, such as AR, are typically consumed on lightweight, low processing power devices, such as AR glasses, for which long battery life is also a major design hurdle/limitation. Another limitation of current technology is a suitable method to configure the sending of AWL models and its associated data via IMS between two supporting clients (e.g., two UEs or a UE and an MRF). For many media applications which have a dynamic characteristic, such as conversational media services, or even streaming media services, the introduction of AI/ML for these services also raises an issue of synchronization between the media data streams, and the AI/ML model data streams, since the AI/ML model data may also change dynamically according to the specific characteristics of the media to be processed. In summary:

How to enable clients (e.g. MRF or UE) to identify and select data streams to be used for a given AI/ML media service using IMS?

Such streams include specifically video, audio, AI/ML model data

How to synchronize multiple streams delivered using RTP and SCPT, for a given AI/ML media service?

Embodiments provide delivery of AWL models and associated data for conversational video and audio. By defining new parameters for SDP signaling, a receiver may request only the required AI/ML models which are required for conversational service at hand.

In order to request such AI/ML models, the receiving client must be able to identify which AI/ML models are associated with the desired media data steams (e.g., video or audio) since these models are typically customized to the media stream when prepared by a content provider. In addition, more than one AI/ML model may be available for the AI processing of a certain media stream, in which case the receiving client may select a desired AI/ML model according to its capabilities, resources, or other concerning factor.

Embodiments enable UE capability, service requirement driven AI/ML model identification, selection, delivery and inference between network (MRF) and UE for conversational or real-time multimedia telephony services using IMS (MTSI). Embodiments also enable synchronization of multiple streams (e.g., video, audio, AI/ML model data) delivered using RTP and stream control transmission protocol (SCTP), for a given AI/ML media service.

FIG. 1 is a diagram illustrating a wireless communication system, according to an embodiment. Specifically, FIG. 1 illustrates a structure of a 3G network including a UE, a NodeB (NodeB), a radio network controller (RNC), and a mobile switching center (MSC). Referring to FIG. 1, the network is connected to another mobile communication network and a public switched telephone network (PSTN). In such a 3G network, voice is compressed/restored with an adaptive multi-rate (AMR) codec, and the AMR codec is installed in a terminal and MSC to provide a two-way call service. The MSC converts the voice compressed in the AMR codec into a pulse code modulation (PCM) format and transmits it to the PSTN, or vice versa, transmits the voice in the PCM format from the PSTN, compresses it into the AMR codec, and transmits it to the base station. The RNC can control the call bit rate of the voice codec installed in the UE and MSC in real time using the codec mode control (CMC) message.

However, as a packet-switched network is introduced in 4G, the voice codec is installed only in the terminal, and the voice frame compressed at intervals of 20 ms is not restored at the base station or the network node located in the middle of the transmission path and is transmitted to the counterpart terminal.

Figure 2:
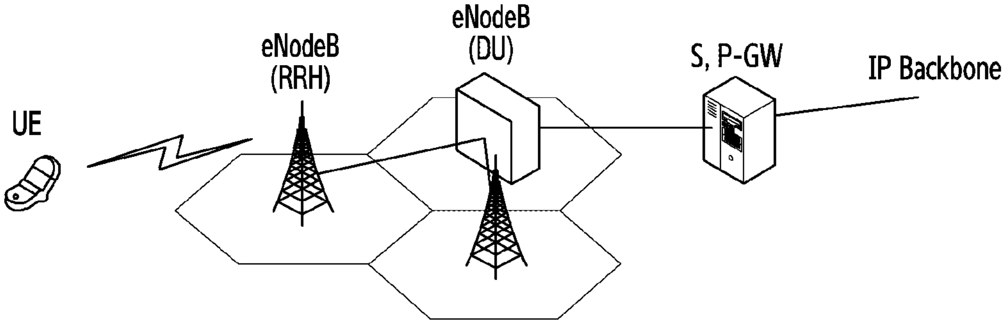
FIG. 2 is a diagram illustrating a wireless communication system, according to an embodiment.

FIG. 2 is a diagram illustrating a wireless communication network, according to an embodiment. Specifically, FIG. 2 illustrates a structure of a long-term evolution (LTE) network, wherein the voice codec is installed only in the UE, and each terminal can adjust the voice bit rate of the counterpart terminal using a codec mode request (CMR) message. In FIG. 2, the eNodeB, which is a base station, is divided into a remote radio head (RRH) dedicated to RF functions and a digital unit (DU) dedicated to modem digital signal processing. The eNodeB is connected to the IP backbone network through the serving gateway (S-GW) and packet data network gateway (P-GW). The IP backbone network is connected to the mobile communication network or Internet of other service providers.

Figure 3:
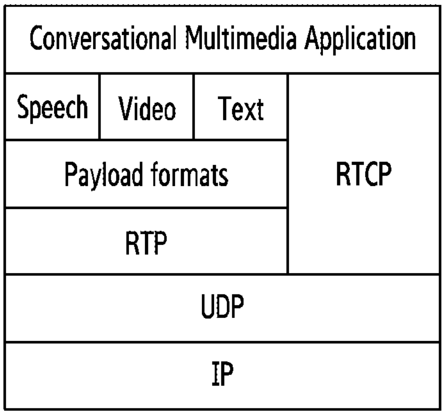
FIG. 3 is a diagram illustrating a structure of a voice and video codec of a voice over long term evolution (VoLTE) supported terminal and a real-time transport protocol (RTP)/user datagram protocol (UDP)/Internet protocol (IP), according to an embodiment.

FIG. 3 is a diagram illustrating a structure of a voice and video codec of a VoLTE supported terminal and an RTP/UDP/IP protocol, according to an embodiment. The IP protocol located at the bottom of this structure is connected to the PDCP located at the top of the protocol structure. The RTP/UDP/IP header is attached to the compressed media frame in the voice and video codec and transmitted to the counterpart terminal through the LTE network. In addition, the counterpart terminal receives the media packet compressed and transmitted from the network, restores the media, listens to the speaker and the display, and views the media. Even if the compressed voice and video packet do not arrive at the same time, the timestamp information of the RTP protocol header is used to synchronize the two media to listen and watch.

Figure 4:
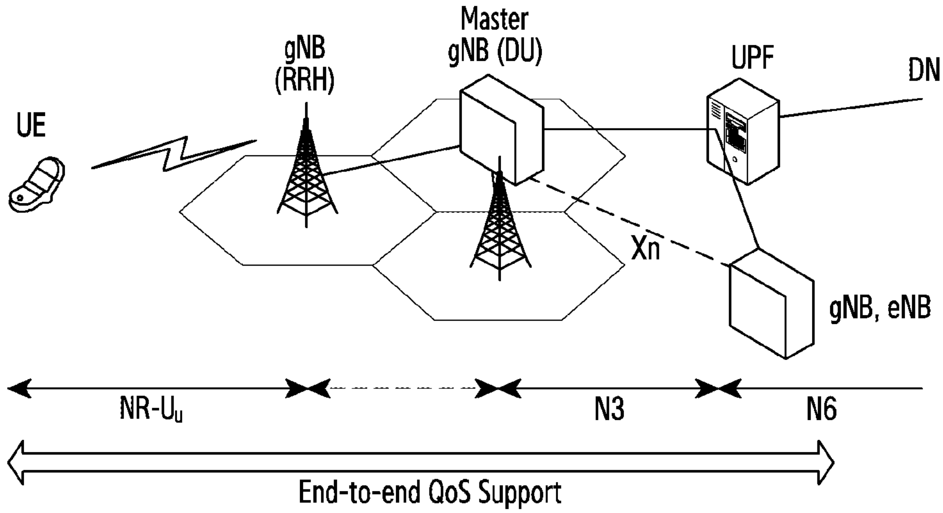
FIG. 4 is a diagram illustrating media contents transmitted based on a 5G network, according to an embodiment.

FIG. 4 is a diagram illustrating media contents transmitted based on a 5G network, according to an embodiment. The 5G nodes corresponding to the eNodeB, S-GW, and P-GW of LTE are gNB, user plane function (UPF) entity, and data network (DN). Conversational media, including video and audio, may be transmitted using the 5G network. Additionally, data related AI model (e.g., model data and related intermediate data) may also be transmitted using the 5G network.

Figure 5:
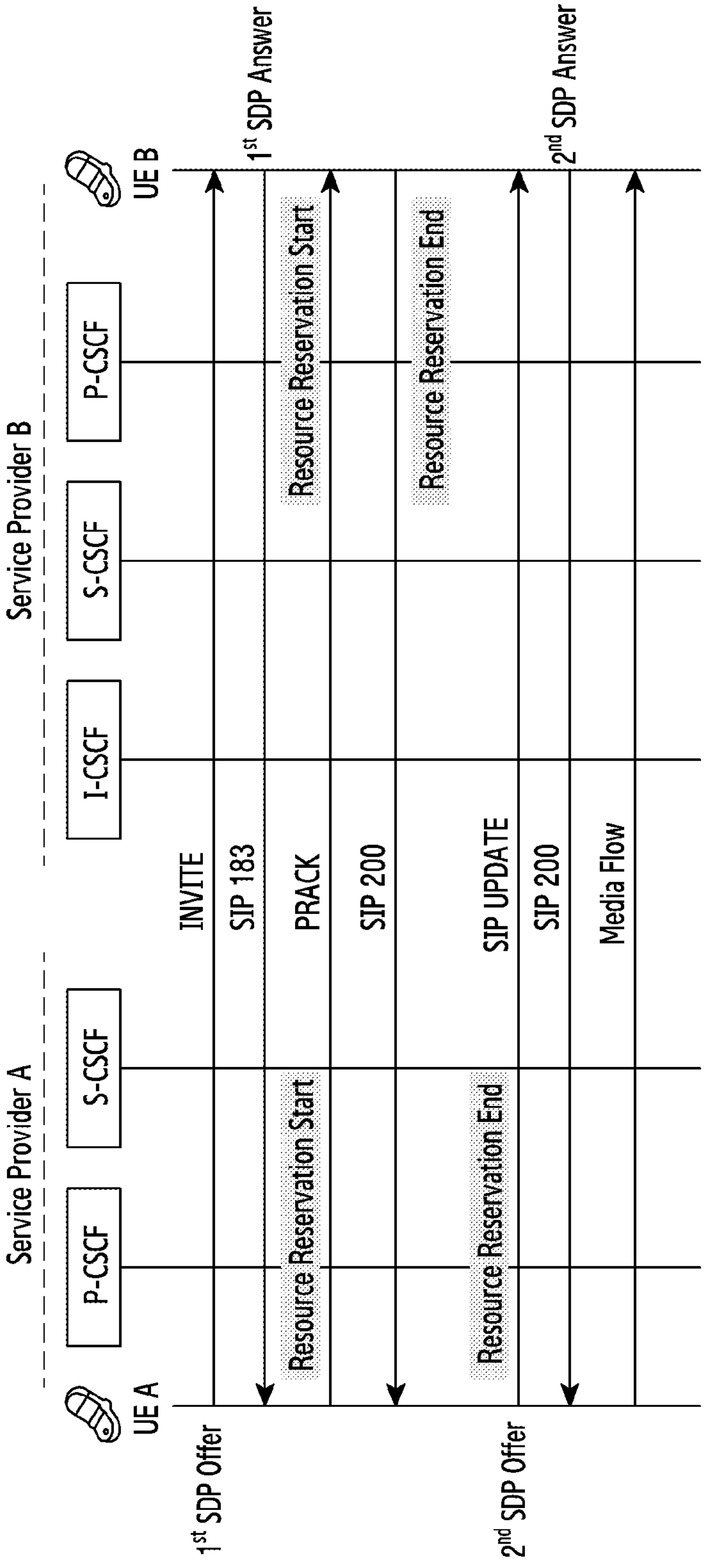
FIG. 5 is a diagram illustrating a procedure for a transmitting terminal and a receiving terminal to negotiate a transmission method of a conversational service using the IP multimedia subsystem, according to an embodiment.

FIG. 5 is a diagram illustrating a procedure for a transmitting terminal and a receiving terminal to negotiate a transmission method of a conversational service using the IP multimedia subsystem, according to an embodiment. Specifically, FIG. 5 illustrates a procedure for a transmitting terminal (UE A) and a receiving terminal (UE B) to negotiate a transmission method of a conversational service using the IP multimedia subsystem shown in FIG. 4 and to secure the quality of service (QoS) of a wired and wireless transmission path. The transmitting terminal transmits the SDP request message to the proxy call session control function (P-CSCF), which has an IMS node allocated to it, in the session initiation protocol (SIP) invite message. This message is transmitted to the IMS connected to the counterpart terminal through nodes such as session call session control function (S-CSCF) and interrogating call session control function (I-CSCF) and finally to the receiving terminal.

The receiving terminal selects the acceptable bit rate and the transmission method from among the bit rates proposed by the transmitting terminal. For an AI based conversational service, the receiving terminal may also select the desired configuration of AI inferencing (together with required AI models and possible intermediate data) according to that offered by the sending terminal, including these information in an SDP answer message in the SIP 183 message in order to transmit the SDP answer message to the transmitting terminal. In this case, the sending terminal may be an MRF instead of a UE device. In the process of transmitting this message to the transmitting terminal, each IMS node starts to reserve the transmission resources of the wired and wireless networks required for this service, and all the conditions of the session are agreed through additional procedures. A transmitting terminal that confirms that transmission resources of all transmission sections are secured transmits the 360 fisheye image videos to the receiving terminal.

Figure 6:
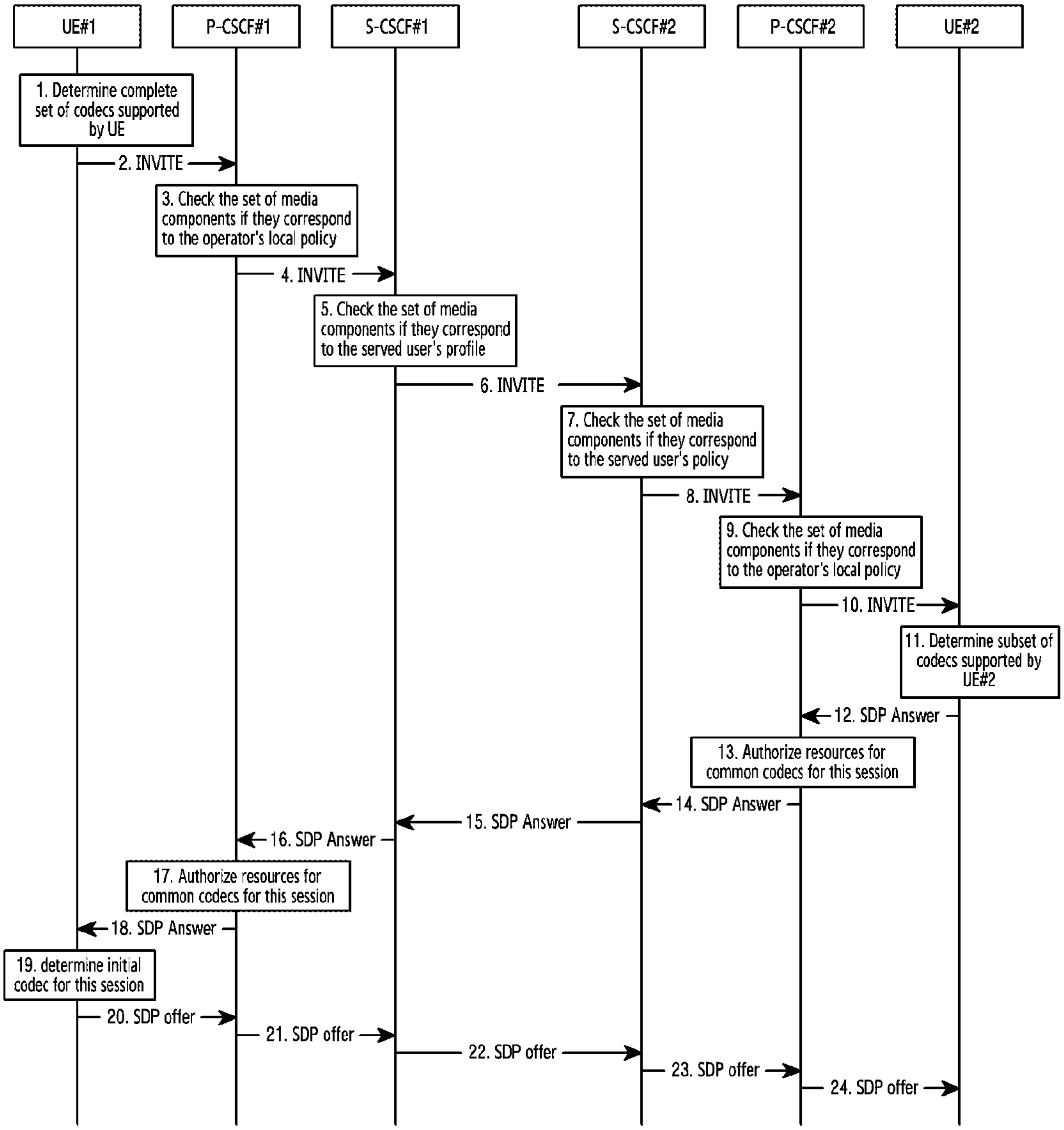
FIG. 6 is a diagram illustrating a procedure for establishing an SDP answer from an SDP offer transmitted by the transmitting terminal by the receiving terminal, according to an embodiment.

FIG. 6 is a diagram illustrating a procedure for establishing an SDP answer from an SDP offer transmitted by the transmitting terminal by the receiving terminal, according to an embodiment.

At step 1, UE #1 inserts the codec(s) to an SDP payload. The inserted codec(s) shall reflect the UE #1's terminal capabilities and user preferences for the session capable of supporting for this session. It builds an SDP containing bandwidth requirements and characteristics of each, and assigns local port numbers for each possible media flow. Multiple media flows may be offered, and for each media flow (m=line in SDP), there may be multiple codec choices offered.

At step 2, UE #1 sends the initial INVITE message to P-CSCF #1 containing this SDP.

At step 3, P-CSCF #1 examines the media parameters. If P-CSCF #1 finds media parameters not allowed to be used within an IMS session (based on P-CSCF local policies, or if available bandwidth authorization limitation information coming from the PCRF/PCF), it rejects the session initiation attempt. This rejection shall contain sufficient information for the originating UE to re-attempt session initiation with media parameters that are allowed by local policy of P-CSCF #1's network according to the procedures specified in IETF RFC 3261 [12].

In this flow described in FIG. 6 above the P-CSCF #1 allows the initial session initiation attempt to continue.

Whether the P-CSCF should interact with PCRF/PCF in this step is based on operator policy.

At step 4, P-CSCF #1 forwards the INVITE message to S-CSCF #1.

At step 5, S-CSCF #1 examines the media parameters. If S-CSCF #1 finds media parameters that local policy or the originating user's subscriber profile does not allow to be used within an IMS session, it rejects the session initiation attempt. This rejection shall contain sufficient information for the originating UE to re-attempt session initiation with media parameters that are allowed by the originating user's subscriber profile and by local policy of S-CSCF #1's network according to the procedures specified in IETF RFC 3261 [12].

In this flow described in FIG. 6 above the S-CSCF #1 allows the initial session initiation attempt to continue.

At step 6, S-CSCF #1 forwards the INVITE, through the S-S Session Flow Procedures, to S-CSCF #2.

At step 7, S-CSCF #2 examines the media parameters. If S-CSCF #2 finds media parameters that local policy or the terminating user's subscriber profile does not allow to be used within an IMS session, it rejects the session initiation attempt. This rejection shall contain sufficient information for the originating UE to re-attempt session initiation with media parameters that are allowed by the terminating user's subscriber profile and by local policy of S-CSCF #2's network according to the procedures specified in IETF RFC 3261 [12].

In this flow described in FIG. 6 above the S-CSCF #2 allows the initial session initiation attempt to continue.

At step 8, S-CSCF #2 forwards the INVITE message to P-CSCF #2.

At step 9, P-CSCF #2 examines the media parameters. If P-CSCF #2 finds media parameters not allowed to be used within an IMS session (based on P-CSCF local policies, or if available bandwidth authorization limitation information coming from the PCRF/PCF), it rejects the session initiation attempt. This rejection shall contain sufficient information for the originating UE to re-attempt session initiation with media parameters that are allowed by local policy of P-CSCF #2's network according to the procedures specified in IETF RFC 3261 [12].

In this flow described in FIG. 6 above the P-CSCF #2 allows the initial session initiation attempt to continue.

Whether the P-CSCF should interact with PCRF/PCF in this step is based on operator policy.

At step 10, P-CSCF #2 forwards the INVITE message to UE #2.

At step 11, UE #2 determines the complete set of codecs that it is capable of supporting for this session. It determines the intersection with those appearing in the SDP in the INVITE message. For each media flow that is not supported, UE #2 inserts an SDP entry for media (m=line) with port=0. For each media flow that is supported, UE #2 inserts an SDP entry with an assigned port and with the codecs in common with those in the SDP from UE #1.

At step 12, UE #2 returns the SDP listing common media flows and codecs to P-CSCF #2.

At step 13, P-CSCF #2 authorizes the QoS resources for the remaining media flows and codec choices.

At step 14, P-CSCF #2 forwards the SDP response to S-CSCF #2.

At step 15, S-CSCF #2 forwards the SDP response to S-CSCF #1.

At step 16, S-CSCF #1 forwards the SDP response to P-CSCF #1.

At step 17, P-CSCF #1 authorizes the QoS resources for the remaining media flows and codec choices.

At step 18, P-CSCF #1 forwards the SDP response to UE #1.

At step 19, UE #1 determines which media flows should be used for this session, and which codecs should be used for each of those media flows. If there was more than one media flow, or if there was more than one choice of codec for a media flow, then UE #1 need to renegotiate the codecs by sending another offer to reduce codec to one with the UE #2.

At steps 20-24, UE #1 sends the "Offered SDP" message to UE #2, along the signaling path established by the INVITE request.

The remainder of the multi-media session completes identically to a single media/single codec session, if the negotiation results in a single codec per media.

Figure 7:
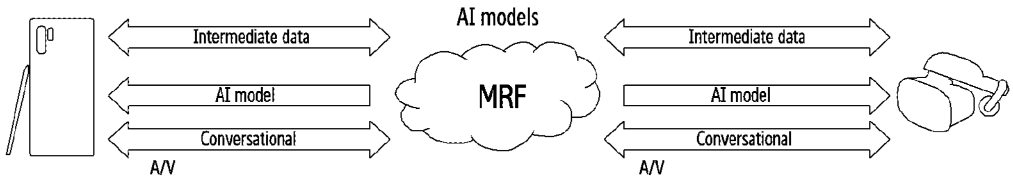
FIG. 7 is a diagram illustrating a user plane flow for an AI based real-time/conversational service between two UEs with an MRF, according to an embodiment.

FIG. 7 is a diagram illustrating a user plane flow for an AI based real-time/conversational service between two UEs with an MRF, according to an embodiment. Real-time audio and video data are exchanged between the two UEs, via the MRF, which can perform any necessary media processing for the media data. When AI is introduced to the conversational service (e.g., when the conversational video received needs to be processed using an AI model on the UE, like processing to create and avatar, or to recreate a 3D point cloud), the MRF also delivers the necessary AI model(s) needed by the UEs for the corresponding service. AI inferencing (e.g., for media processing) can also be split between the UE and MRF, in which case the intermediate data from the output of the inferencing at the MRF also needs to be delivered to the UE, to be used as the input to the inferencing at the UE. For this split inference case, the AI model delivered from the MRF to the UE is typically a split partial AI model.

Herein, AI inference/inferencing refers to the use of a trained AI neural network in order to yield results, by feeding into the neural network input data, which consequently returns output results. During the AI training phase, the neural network is trained with multiple data sets in order to develop intelligence, and once trained, the neural network is run, or "inferenced" using an inference engine, by feeding input data into the neural network. The intelligence gathered and stored in the trained neural network during the learning stage is used to understand such new input data.

Typical examples of AI inferencing for multimedia applications include feeding low resolution video into a trained AI neural network, which is inferenced to output high resolution video (AI upscaling), and feeding video into a trained AI neural network, which is inferenced to output labels for facial recognition in the video (AI facial recognition).

Many AI for multimedia applications involve machine vision based scenarios where object recognition is a key part of the output result from AI inferencing.

Figure 8A:
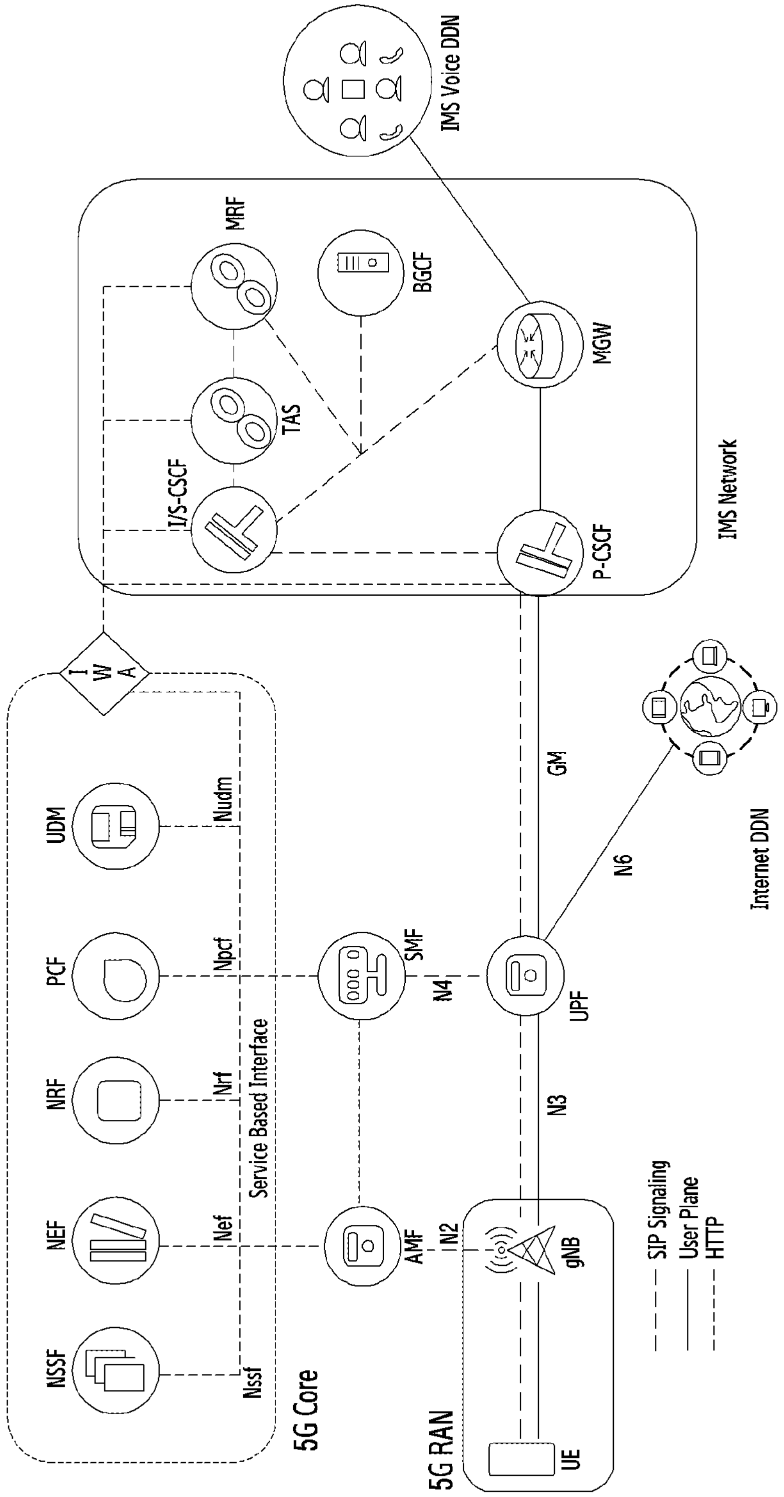
FIG. 8A is a diagram illustrating an integration of the 5GS with an IP multimedia subsystem (IMS) network, according to an embodiment.

FIG. 8A is a diagram illustrating an integration of the 5GS with an IMS network, according to an embodiment. The AI/ML conversational/real-time media service concerns this architecture, where the UE establishes a connection (e.g., via SIP signaling, SDP negotiation, as described in FIG. 5 and FIG. 6) with the MRF in the IMS network, which performs any necessary media processing between the UE, and another UE (where present).

Figure 8B:
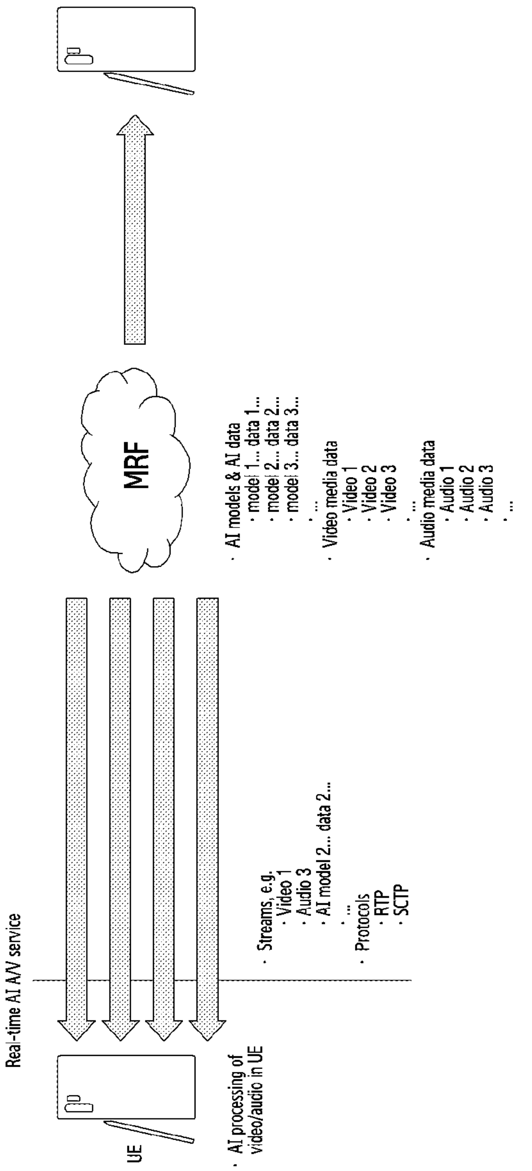
FIG. 8B is a diagram illustrating a flow of data between a UE and the MRF for a real-time AI media service, according to an embodiment.

FIG. 8B is a diagram illustrating a flow of data between a UE and the MRF for a real-time AI media service, according to an embodiment. Available to the MRF are multiple media data, which include different video and audio media data. Since this is an AI media service, different specific AI models and AI data which are used for the AI processing of the same video and audio media data, are also available at the MRF. The MRF is able to identify which AI model and data is relevant to which media (e.g., video or audio) data stream, since AI models are typically matched/customized to the media data for AI processing. The available data (e.g., including AI models & data, video data, audio data, etc.) at the MRF are included in an SDP offer and sent to the UE, which receives the offer, parses the information contained in the offer, and sends back an SDP answer to the MRF (as described in FIG. 5 and FIG. 6). The specifics of the information (e.g., SDP attributes, parameters, etc.) are defined in the tables below. Through this SDP negotiation of sending offers and answers back and forth, the UE and MRF then establish multiple streams to send the negotiated data between them. Media streams between the UE and MRF are sent via RTP, whilst AI model and AI data streams are sent via the data channel via SCTP (as described in FIG. 9). On receipt of these media and AI model/data streams, the receiving entity (UE) inputs the media streams into the associated AI model (with its corresponding AI data) for AI processing.

Figure 9:
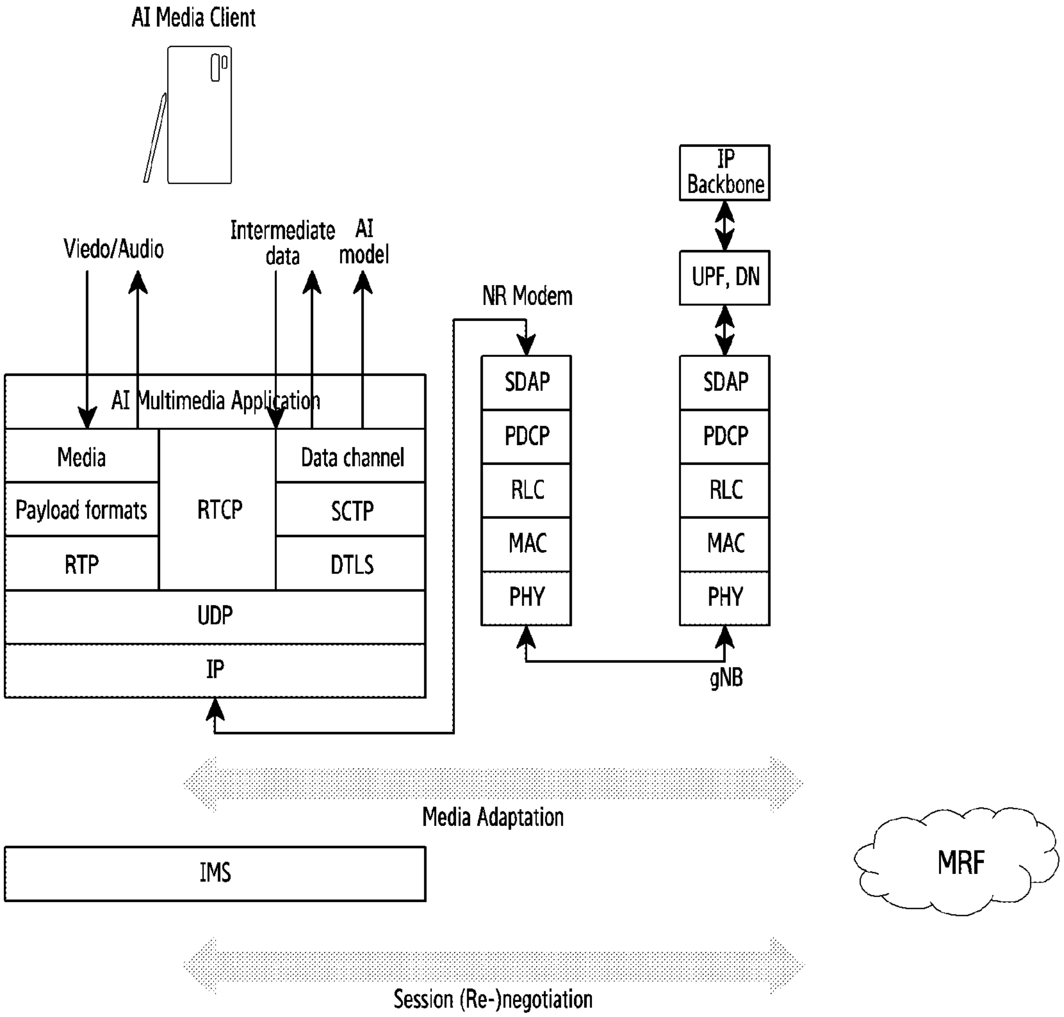
FIG. 9 is a diagram illustrating a structure of a 5G AI media client terminal supporting audio/voice and video codecs as well as AI model and intermediate data related media processing functionalities, and an RTP/UDP/IP protocol, according to an embodiment.
Figure 12:
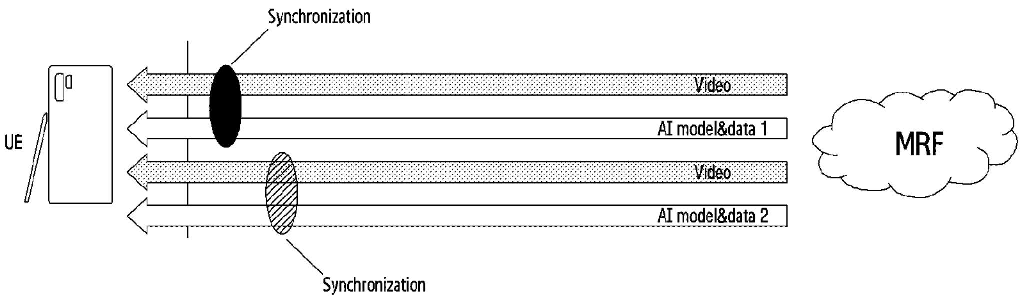
FIG. 12 is a diagram illustrating four data streams established between the sending entity (MRF) and the receiving entity (UE) in a real-time AI media service session, according to an embodiment.
Figure 13:
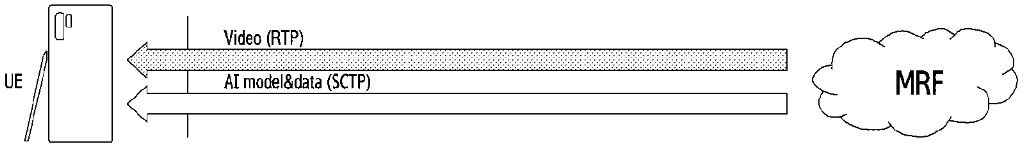
FIG. 13 is a diagram illustrating the delivery of two synchronized streams between a sending entity (MRF) and a receiving entity (UE), according to an embodiment.

FIG. 9 is a diagram illustrating a structure of a 5G AI media client terminal supporting audio/voice and video codecs as well as AI model and intermediate data related media processing functionalities, and an RTP/UDP/IP protocol, according to an embodiment. Referring to FIG. 9, the IP protocol located at the bottom of this structure is connected to the PDCP located at the top of the protocol structure. The RTP/UDP/IP header is attached to the compressed media frame in the voice and video codec and transmitted to the counterpart terminal through the 5G network. Whilst traditional real-time conversational video and audio are passed through media codecs, encapsulated with corresponding payload formats and delivered via RTP/UDP/IP, AI model data and intermediate data (where necessary in the case of split inferencing) are delivered via web-based real time communication (WebRTC) data channels via SCTP/data transport layer security (DTLS). RTP streams are synchronized via the synchronization source (SSRC) identifier, whilst SCTP streams are synchronized using the corresponding synchronization chunk SCTP payload protocol identifier/protocol/format as described in greater detail below (FIGS. 12 and 13, Tables 3 to 7).

TABLE 1

The SDP attribute 3gpp_AImedia is used to indicate a video or audio stream intended for AI processing.
Clients supporting video/audio streams intended for AI processing shall support the 3gpp_AImedia attribute and shall support the following procedures:

- when sending an SDP offer, the sending client includes the 3gpp_AImedia attribute in the media description for video or audio in the SDP offer
- when sending an SDP answer, the receiving client includes the 3gpp_AImedia attribute in the media description for video or audio in the SDP answer if the 3gpp_AImedia attribute was received in an SDP offer
- after successful negotiation of the 3gpp_AImedia attribute in the SDP, the MTSI clients exchange an RTP-based video/audio stream which is intended for AI processing. The AI model intended to be used for such processing is described under the 3gpp_AImedia attribute.

When more than one AI/ML model is associated with one media stream, multiple AImodel parameters (<AImodel-1> ... <AImodel-N>) identifying these AI/ML models may be present under this attribute when present inside an SDP offer.
On receiving the SDP offer, a receiving client may opt to select one or more of these associated AI/ML models, by including the corresponding parameter (e.g. <AImodel-X>, where AI model X is the selected model) under the same attribute (3gpp_AImedia) when including the m-line in the SDP answer.
The syntax for the SDP attribute is:

a=3gpp_AImedia: <task result> <AImodel>

- The task results which can be expected after AI processing of this media stream.
  Depending on the media service and processing configuration of the sending and receiving clients, the sending client may offer multiple task results which can be expected as an output of this media stream after AI processing, in the SDP offer. The receiving client may select one or more of these task results for the media service, indicated by the inclusion of this parameter in the SDP answer.
  - <task result>: this parameter inside an SDP offer sent by a sending client indicates the possible task results after AI processing of this media stream. This parameter(s) inside an SDP answer sent by the receiving client indicates the task result(s) requested by the receiving client, to the sending client. Examples include object recognition, super-resolution, language translation etc.
- The corresponding AI/ML model(s) (and corresponding parameters) which should be used for the AI processing of this media stream.
  For the UE to be able to associate this media stream with an AI/ML model for its intended AI processing, one or more AI models should be matched with this media stream, indicated by this parameter, according to the media service. Multiple AI models may be present in an SDP offer by a sending entity, from which one or more AI models may be selected by a receiving entity (and included in the SDP answer), depending on the different requirements of the AI media service, receiver device capabilities, device or network resources, or any other concerning factors.

<AImodel> = <AImodel-1> ... <AImodel-N>
<AImodel-X> = [<id-X> <result> <dynamic> <synchronized>] for 1 ≤ X ≤ N where:

- <id>: this parameter inside an SDP offer or answer, under an m-line corresponding to media data, and under the 3gpp_AImedia attribute, indicates the identifier of the AI/ML model for which the media stream should be fed into as an input.
  When AI/ML model and AI/ML data is sent via a data channel stream, this parameter shall match the identifier parameter under the a=3gpp_AImodel data channel sub-protocol attribute for the AI/ML model stream.
  When AI/ML model(s) already exist in the receiving UE, this parameter shall enable the identification of the associated AI/ML model in the UE.
- <result>: this parameter inside an SDP offer sent by a sending client indicates the task result of the AI/ML model data for AI processing. The task result specified by this parameter shall be one from that of those specified by the <task result> parameter.
- <dynamic>: this parameter inside an SDP offer sent by a sending client indicates that the AI/ML model data for AI processing of this media stream is dynamic. When this parameter is absent, the AI/ML model is static.
  This parameter indicates whether the AI/ML model data for AI processing of this media stream is dynamic or static.
  Depending on the service type and scenario, AI/ML models and its data (e.g. weights, biases) may change dynamically during the media service, as indicated by this parameter.
- <synchronized>: this parameter inside an SDP offer sent by a sending client indicates that the AI/ML model data is synchronized with the media stream, as identified by the presence of an SCTP synchronization data chunk for the AI/ML model data stream. The mechanisms of synchronization between the SCTP stream(s) and associated RTC stream(s) are described under figures 12, 13, and tables 3 to 7.
  This parameter indicates whether the AI/ML model data for the AI processing of this media stream is synchronized with the media stream or not.
  Depending on the service type and scenario, AI/ML models which change dynamically during the media service may need to be synchronized with the media stream.

When this parameter is present under an m-line, the <dynamic> parameter shall also be present under the same m-line.

The syntax and semantics in Table 1 defines an SDP attribute 3gpp_AImedia which is included under the m-line of any media stream (e.g., video or audio) for which there is an associated AI/ML model (or models) which should be used for AI processing of the media stream. This attribute is used to identify which AI model(s) and data is relevant to the m-line media (e.g., video or audio) data stream for which this attribute is under. By the nature of the syntax and semantics as defined in table 1, this attribute can be used by a sending entity (e.g., MRF) to provide a list of possible configurations for AI/ML processing of the corresponding media stream (as specified by the m-line), from which a receiving entity (e.g., UE) can identify and select its required/wanted/desired configuration through the selection of one or more AI/ML models listed in the SDP offer. The selected models are then included in the SDP answer under the same attribute, and sent to the sending entity.

Synchronization of RTC and SCTP streams in this invention is defined as where the RTP source(s) and SCTP source(s) use the same clock. When media is delivered via RTC, and AI model data is delivered via SCTP, media captured at time t of the RTP stream is intended to be fed into the AI model data defined at time t of the SCTP stream.

Figure 10:
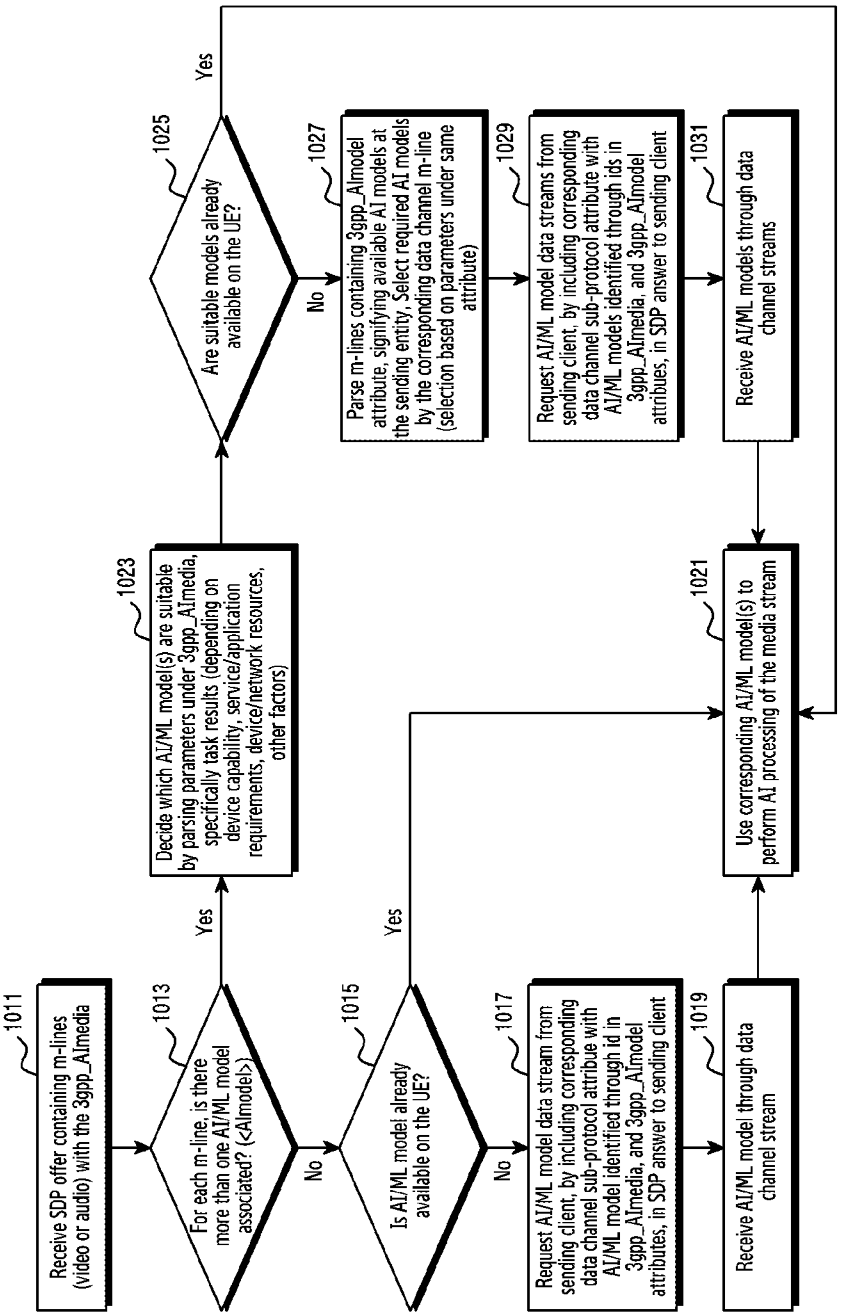
FIG. 10 is a flow diagram illustrating operations by the receiving entity for a real-time AI media service, when performing SDP negotiation with a sending entity, according to an embodiment.

FIG. 10 is a flow diagram illustrating operations by the receiving entity (e.g., UE) for a real-time AI media service, when performing SDP negotiation with a sending entity (e.g., MRF), according to an embodiment. Once AI model(s) from the 3gpp_AImedia attribute under the media data m-lines are identified, in case that the identified models also need to be delivered to the receiving client, the receiving client shall request the corresponding AI models from the sending entity. One method to request these corresponding AI models is by selection from a list of AI model data channel streams offered by the sending entity in the SDP offer. AI model data channel streams are identified since they contain the 3gpp_AImodel sub-protocol attribute under the SDP DCSA attribute for the corresponding WebRTC data channel in the SDP offer.

According to an embodiment, at step 1011, the receiving entity may receive SDP offer containing m-lines (video or audio) with the 3gpp_AImedia.

At step 1013, the receiving entity may identify whether there is more than one AI/ML model associated for each m-line.

At step 1015, in case that more than one AI model associated with the media data does not exist, the receiving entity may identify whether the AI/ML model already available on the UE. For example, the receiving entity may identify whether the AI/ML model suitable for the processing the media data is already stored in the receiving entity.

At step 1017, in case that the AI/ML model available on the UE does not exist, the receiving entity may request the AI/ML model data stream from sending client, by including corresponding data channel sub-protocol attribute with AI/ML model identified through id in 3gpp_AImedia, and 3gpp_Almodel attributes, in the SDP answer to the sending client.

At step 1019, the receiving entity may receive AI/ML model through the data channel stream.

At step 1021, in case that the AI/ML model available on the UE exists, the receiving entity may use corresponding AI/ML model(s) to perform AI processing of the media stream. For example, the receiving entity may process the data which is delivered to the receiving entity via the media data stream, based on the AI/ML model corresponding to the media data.

At step 1023, in case that more than one AI model associated with the media data exists, the receiving entity may decide which AI/ML models are suitable by parsing parameters under 3gpp_AImedia. For example, the parameters may include task results, a device capability, service/application requirements, device/network resources and/or other factors. For example, the task results may depend on a device capability, service/application requirements, device/network resources and/or other factors.

At step 1025, the receiving entity may identify whether suitable models are already available on the UE.

At step 1027, in case that the suitable models available on the UE do not exist, the receiving entity may parse m-lines containing the 3gpp_AI model attribute, signifying available AI models at the sending entity. The receiving entity may select required AI models by the corresponding data channel m-line (selection based on parameters under same attribute). For example, the receiving entity may identify AI models based on the 3gpp_AI model attribute including information on task results, a device capability, service/application requirements, device/network resources and/or other factors.

At step 1029, the receiving entity may request the AI/ML model data streams from the sending client, by including corresponding data channel sub-protocol attribute with AI/ML models identified through ids in 3gpp-AImedia and 3gpp_Almodel attributes, in the SDP answer to sending client.

At step 1031, the receiving entity may receive the AI/ML models through data channel streams.

The step 1021 may be performed by the receiving entity after performing the step 1025 (in case that the suitable models available on the UE exists) or the step 1031.

Figure 11:
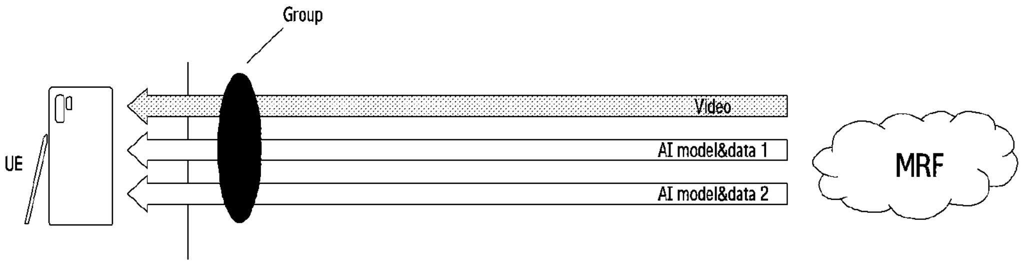
FIG. 11 is a diagram illustrating a method which can associate multiple data streams from the sending entity to the receiving entity for a give AI media service, according to an embodiment.

FIG. 11 is a diagram illustrating a method which can associate multiple data streams from the sending entity to the receiving entity for a given AI media service, according to an embodiment. When multiple data streams are present at the sending entity (e.g., MRF) such as that shown in FIG. 8B, a combination of these data streams can be grouped together. This grouping is indicated by the sending entity in the SDP offer. Each group contains at most only one media data stream (e.g., video or audio), and at least one AI model data stream, which signifies that the media data stream should be processed using any of the grouped AI models. On receipt of the SDP offer from the sending entity, the receiving entity parses the group information in the SDP offer, and selects to receive the media stream (e.g., video or audio), as well as one or more of the AI model data channel streams inside the group. A receiving entity may choose to receive only one AI model, or multiple AI models from a group (by including them in the SDP answer), such that it can have multiple AI models available on the device to perform AI processing. Multiple groups may exist in the SDP offer and answer, typically to support multiple media types (e.g., one group for AI processing of a video stream, and another group for AI processing of an audio stream).

TABLE 2

The SDP attribute AI4Media_group is included in the SDP before any media lines when a client sends an SDP message with at least one video/audio stream and at least one data channel stream containing AI model data.

a=AI4Media_group: <group-1> / ... / <group-N>

TABLE 2-continued

Where <group-X> shall include exactly one mid associated with video or audio (or another media type such as 3D media) intended for AI processing and at least one mid associated with an AI model data stream sent using a WebRTC data channel, as defined by the mid attribute in the corresponding media description.
The ABNF syntax for this attribute is the following:
att-field = "AI4Media_group"
att-value = media-id-tag SP media-id-tag *[SP media-id-tag]
media-id-tag = identification-tag ["(" dcmap-stream-id*[";" dcmap-stream-id"] ")"]
identification-tag = token
dcmap-stream-id = 1*5DIGIT
token = 1*(token-char)
token-char = %x21 / %x23-27 / %x2A-2B / %x2D-2E / %x30-39 / %x41-5A / %x5E-7E
DIGIT = %x30-39

The syntax and semantics in Table 2 is an example of a grouping attribute mechanism to enable the group of data streams for a real-time AI media service as described in FIG. 11.

In an embodiment, the SDP offer may contain at least one group attribute which defines the grouping of RTP streams and SCTP streams. In one example, SCTP streams carry AI model data and RTP streams carry media data. Each group defined by this attribute contains information to identify exactly one media stream, and at least one associated AI model stream. The exactly one media RTC stream is identified through the mid under the media stream's corresponding m-line, and each AI model SCTP stream is identified through the mid together with the dcmap-stream-id parameter.

In another embodiment, each group defined by this attribute may contain multiple media streams, as well as multiple AI model streams.

In a further embodiment, each group defined by this attribute may contain only one media stream, and only one AI model stream.

For the grouping mechanisms defined above, RTP streams and SCTP streams may be synchronized according to the mechanisms defined in FIG. 12, FIG. 13 and Tables 3 to 7.

In one embodiment, RTP streams and SCTP streams are assumed to be synchronized if associated under the same group attribute defined above.

In another embodiment, RTP streams and SCTP streams are assumed to be synchronized only if the <synchronized> parameter exists under the RTP media stream m-lines, even if the RTP streams and SCTP streams are associated under the same group attribute.

FIG. 12 is a diagram illustrating four data streams established between the sending entity (MRF) and the receiving entity (UE) in a real-time AI media service session, according to an embodiment. In this embodiment, the video stream and AI model & data 1 stream are associated, whilst the audio stream and AI model and data 2 stream are likewise associated. Furthermore, the associated streams are time synchronized with each other. In such a case, the video stream is typically processed by being feed into the AI model and data 1 at the UE, and likewise for the audio stream.

Since both video and audio media data change with time, the AI model and data used for its AI processing may also change dynamically to match these time characteristics. The interval of how often an AI model and its AI data may change depends on the specific characteristics of the media, for example: per frame, per GoP, per determined scene within a movie etc., or it may also be changed according to an arbitrary time period (e.g., every 30 seconds).

For the dynamically changing AI model and AI data as described above, it is necessary for the media streams and corresponding AI model/AI data streams to be time synchronization. At the receiving entity (UE), only when the two streams are synchronized will it be able to calculate what AI model and its related data should be used to process the media at a given time. Synchronization between media and AI model data streams is indicated by the <synchronized> parameter under the 3gpp_AImedia attribute under the media m-line as described in table 1. A mechanism of how the associated media and AI model streams can be synchronized is described in FIG. 13, together with mechanisms as shown and described in Tables 5 and 7.

FIG. 13 is a diagram illustrating the delivery of two synchronized streams between a sending entity (MRF) and a receiving entity (UE), according to an embodiment. One stream is a video media stream, and another stream is an AI model & data stream. As shown and described in FIG. 9, the video media stream is delivered via RTP/UDP/IP, whilst the AI model is delivered via a WebRTC data channel via SCTP/DTLS. Whilst two RTP streams can be synchronized using the timestamp, SSRC, and CSRC fields in the RTP header, and also the network time protocol (NTP) timestamp and RTP timestamp fields in the sender report RTCP packet, the SCTP protocol does not contain any equivalent fields in its common header. For synchronizing an SCTP stream with an RTP stream, different embodiments of a new synchronization payload data chunk for SCTP are defined in Tables 5 and 7.

TABLE 3

| Bits | Bits 0-7 | 8-15 | 16-23 | 24-31 |
|---|---|---|---|---|
| +0 | Source port | | Destination port | |
| 32 | Verification tag | | | |
| 64 | Checksum | | | |
| 96 | Chunk 1 type | Chunk 1 flags | Chunk 1 length | |
| 128 | Chunk 1 data | | | |
| . . . | . . . | | | |
| . . . | Chunk N type | Chunk N flags | Chunk N length | |
| . . . | Chunk N data | | | |

Table 3 shows the SCTP packet structure, which consists of a common header, and multiple data chunks.

TABLE 4

| + | Bits 0-7 | 8-11 | 12 | 13 | 14 | 15 | 16-31 |
|---|---|---|---|---|---|---|---|
| e | Chunk type = 0 | Reserved | I | U | B | E | Chunk length |
| 32 | TSN | | | | | | |
| 64 | Stream identifier | | | | | | Stream sequence number |
| 96 | Payload protocol identifier | | | | | | |
| 128 | Data | | | | | | |

Table 4 shows the format of the payload data chunk, where a payload protocol identifier is used to identify the data present in the data chunk (registered to LANA in a first come first served manner).

TABLE 5

| + | Bits 0-7 | 8-11 | 12 | 13 | 14 | 15 | 16-31 |
|---|---|---|---|---|---|---|---|
| 0 | Chunk type = 0 | Reserved | I | U | B | E | Chunk length |
| 32 | TSN | | | | | | |
| 64 | Stream identifier | | | | | | Stream sequence number |
| 96 | Payload protocol identifier | | | | | | |
| 128 | Timestamp | | | | | | |

TABLE 5-continued

| + | Bits 0-7 | 8-11 | 12 | 13 | 14 | 15 | 16-31 |
|---|---|---|---|---|---|---|---|
| 160 | Synchronization source (SSRC) identifier | | | | | | |
| 196 | Contributing source (CSRC) identifier | | | | | | |

A payload protocol identifier (or multiple identifiers) may be defined and specified to identify the different embodiments of synchronization data chunks for SCTP as defined subsequently in this invention. For example, a payload protocol identifier using a previously unassigned value or 74, as "3GPP AI4Media over SCTP", defines one of the embodiments of the synchronization payload data chunk.

In one embodiment of this invention, an SCTP synchronization payload data chunk is defined as shown in Table 5. The syntax and semantics of timestamp, SSRC, and CSRC fields are defined as shown in Table 6.

TABLE 6

Timestamp: 32 bits

The timestamp reflects the sampling instant of the first octet in the SCTP data packet. The sampling instant MUST be derived from a clock that increments monotonically and linearly in time to allow synchronization and jitter calculations. The resolution of the clock MUST be sufficient for the desired synchronization accuracy and for measuring packet arrival jitter (one tick per video frame is typically not sufficient). The clock frequency is dependent on the format of data carried as payload and is specified statically in the profile or payload format specification that defines the format, or MAY be specified dynamically for payload formats defined through non-SCTP means. If SCTP packets are generated periodically, the nominal sampling instant as determined from the sampling clock is to be used, not a reading of the system clock. As an example, for fixed-rate audio the timestamp clock would likely increment by one for each sampling period. If an audio application reads blocks covering 160 sampling periods from the input device, the timestamp would be increased by 160 for each such block, regardless of whether the block is transmitted in a packet or dropped as silent.

The initial value of the timestamp SHOULD be random, as for the sequence number. Several consecutive SCTP packets will have equal timestamps if they are (logically) generated at once, e.g., belong to the same video frame. Consecutive SCTP packets MAY contain timestamps that are not monotonic if the data is not transmitted in the order it was sampled, as in the case of MPEG interpolated video frames. (The sequence numbers of the packets as transmitted will still be monotonic.)

SCTP and RTP timestamps from different data streams may advance at different rates and usually have independent, random offsets. Therefore, although these timestamps are sufficient to reconstruct the timing of a single stream, directly comparing SCTP & RTP timestamps from different media is not effective for synchronization. Instead, for each medium the timestamp is related to the sampling instant by pairing it with a timestamp from a reference clock (wallclock) that represents the time when the data corresponding to the RTP timestamp was sampled. The reference clock is shared by all media to be synchronized. The timestamp pairs are not transmitted in every data packet, but at a lower rate in RTCP SR packets.

The sampling instant is chosen as the point of reference for the SCTP timestamp because it is known to the transmitting endpoint and has a common definition for all media, independent of encoding delays or other processing. The purpose is to allow synchronized presentation of all media sampled at the same time.

Applications transmitting stored data rather than data sampled in real time typically use a virtual presentation timeline derived from wallclock time to determine when the next frame or other unit of each medium in the stored data should be presented. In this case, the SCTP timestamp would reflect the presentation time for each unit. That is, the SCTP timestamp for each unit would be related to the wallclock time at which the unit becomes current on the virtual presentation timeline. Actual presentation occurs some time later as determined by the receiver.

An example describing live audio narration of prerecorded video illustrates the significance of choosing the sampling instant as the reference point. In this scenario, the video would be presented locally for the narrator to view and would be simultaneously transmitted using RTP. The "sampling instant" of a video frame transmitted in RTP would be established by referencing its timestamp to the wallclock time when that video frame was presented to the narrator. The sampling instant for the audio RTP packets containing the narrator's speech would be established by referencing the same wallclock time when the audio was sampled.

The audio and video may even be transmitted by different hosts if the reference clocks on the two hosts are synchronized by some means such as NTP. A receiver can then synchronize presentation of the audio and video packets by relating their RTP timestamps using the timestamp pairs in RTCP SR packets.

SSRC: 32 bits

The SSRC field identifies the synchronization source. This identifier SHOULD be chosen randomly, with the intent that no two synchronization sources within the same RTP &SCTP session will have the same SSRC identifier. Although the probability of multiple sources choosing the same identifier is low, all RTP implementations must be prepared to detect and resolve collisions.

CSRC list: 0 to 15 items, 32 bits each

The CSRC list identifies the contributing sources for the payload contained in this packet. The number of identifiers is given by the CC field. If there are more than 15 contributing sources, only 15 can be identified. CSRC identifiers are inserted by mixers, using the SSRC identifiers of contributing sources. For example, for audio packets the SSRC identifiers of all sources that were mixed together to create a packet are listed, allowing correct talker indication at the receiver.
""

Similar to that of RTP stream packets which contain media data, through the use of these fields in the SCTP packet, as well as the related timestamp fields in the sender report RTCP packet (notably NTP timestamp, RTP timestamp fields), which in this embodiment is considered to be exactly also relevant to the SCTP packets as it is relevant to the RTP packets, the SCTP stream carrying AI model and AI data can be synchronized to the associated media data RTP stream(s).

TABLE 7

| + | Bits 0-7 | 8-11 | 12 | 13 | 14 | 15 | 16-31 |
|---|---|---|---|---|---|---|---|
| 0 | Chunk type = 0 | Reserved | I | U | B | E | Chunk length |
| 32 | TSN | | | | | | |
| 64 | Stream identifier | | | | | | Stream sequence number |
| 96 | Payload protocol identifier | | | | | | |
| 128 | SSRC of sender | | | | | | |
| 160 | NTP timestamp, most significant word | | | | | | |
| 196 | NTP timestamp, least significant word | | | | | | |
| 228 | RTP timestamp | | | | | | |

In another embodiment, an SCTP synchronization payload data chunk is defined as shown in Table 7. The syntax and semantics of SSRC of sender, NTP timestamp and RTP timestamp fields are defined as shown in Table 8 below.

TABLE 8

| SSRC: 32 bits |
|---|
| The synchronization source identifier for the originator of this SCTP packet. The value of this SSRC is the same as the value used in RTC packets and RTCP SR packets. |
| NTP timestamp: 64 bits |
| Indicates the wallclock time when this SCTP packet was sent so that it may be used in combination with RTCP timestamps returned in reception reports from other receivers to measure round-trip propagation to those receivers. It may also be used in combination with timestamps in media stream RTC packets for time synchronization. Receivers should expect that the measurement accuracy of the timestamp may be limited to far less than the resolution of the NTP timestamp. The measurement uncertainty of the timestamp is not indicated as it may not be known. On a system that has no notion of wallclock time but does have some system-specific clock such as "system uptime", a sender MAY use that clock as a reference to calculate relative NTP timestamps. It is important to choose a commonly used clock so that if separate implementations are used to produce the individual streams of a multimedia session, all implementations will use the same clock. Until the year 2036, relative and absolute timestamps will differ in the high bit so (invalid) comparisons will show a large difference; by then one hopes relative timestamps will no longer be needed. A sender that has no notion of wallclock or elapsed time MAY set the NTP timestamp to zero. |
| RTP timestamp: 32 bits |
| Corresponds to the same time as the NTP timestamp (above), but in the same units and with the same random offset as the RTP timestamps in RTP stream data packets. This correspondence may be used for intra- and inter-media synchronization for sources whose NTP timestamps are synchronized, and may be used by media-independent receivers to estimate the nominal SCTP/RTP clock frequency. Note that in most cases this timestamp will not be equal to the RTP timestamp in any adjacent SCTP packet, or RTC stream data packet. Rather, it MUST be calculated from the corresponding NTP timestamp using the relationship between the RTP timestamp counter and real time as maintained by periodically checking the wallclock time at a sampling instant. |

By indicating exact values of NTP timestamp and RTP timestamp for which the SCTP data packet was sent, SCTP packets in the SCTP stream can be synchronized with the associated RTC media streams, by using the same NTP timestamp as indicated in the sender report RTCP packets.

The same values of NTP timestamp, RTP timestamp are used as in sender report RTCP packet.

In another embodiment, the SCTP synchronization payload data chunk may contain only the NTP timestamp which is matched to the sender report RTCP packets from the associated media data RTC streams.

Figure 14:
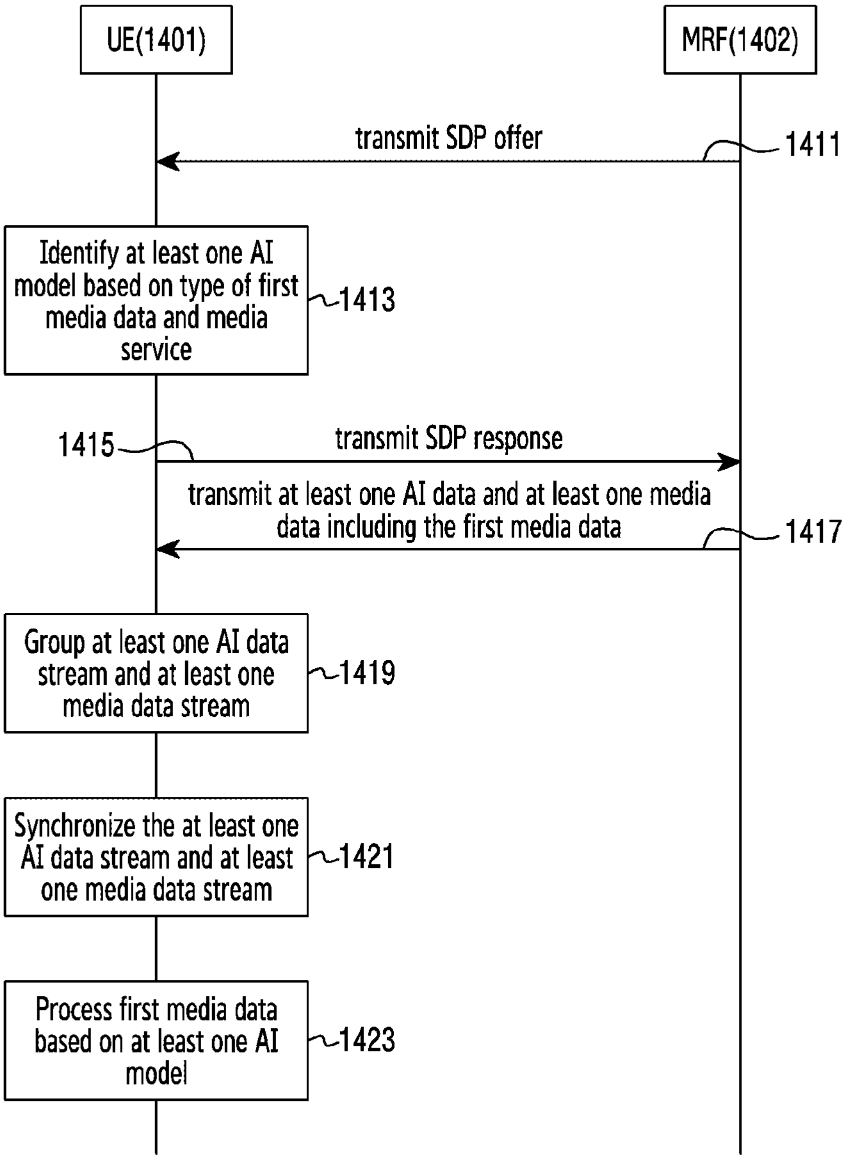
FIG. 14 is a flow diagram illustrating a UE processing a first media data based on at least one AI model received from the MRF, according to an embodiment.

FIG. 14 is a diagram illustrating a UE processing a first media data based on at least one AI model received from the MRF, according to an embodiment.

Referring to FIG. 14, at step 1411, an MRF (or MRF entity) 1402 may transmit, to the UE 1401, SDP offer including at least one of a list of identifiers (IDs) of AI models for outputting results used for media services, information for grouping at least one AI data stream and at least one media data stream, information on a type of first media data, or information on a type of media service in which the results are used. As another example, the UE 1401 may receive the SDP offer from the MRF 1402.

For example, the at least one result includes at least one of object recognition, increasing resolution of images or a language translation.

At step 1413, the UE 1401 may identify at least one AI model for outputting at least one result using the first media data from the list, based on the type of the first media data and the media service in which the at least one result is used.

At step 1415, the UE 1401 may transmit, to the MRF 1402, SDP response as a response to the SDP offer. For example, the SDP response may be for requesting the at least one AI model. As another example, the MRF 1402 may receive the SDP response for requesting the at least one AI model from the UE 1401.

At step 1417, the MRF 1402 may transmit at least one AI data and at least one media data including the first media data. For example, the at least one AI model requested by the UE is transmitted to the UE 1401. For example, the at least one AI data for the at least one AI model is transmitted to the UE 1401. For example, the at least one media data including the first media data and which is used for outputting the at least one result is transmitted to the UE 1401.

At step 1419, the UE 1401 may group the at least one AI data stream in which the at least one AI model and the at least one AI data are received, and the at least one media data stream in which the first media data is received.

At step 1421, the UE 1401 may synchronize the at least one AI data stream and the at least one media data stream.

For example, the UE 1401 may synchronize the at least one AI data stream and the at least one media data stream based on information on timestamps.

At step 1423, the UE 1401 may process the first media data based on the at least one AI model. For example, the UE 1401 may output the at least one result (e.g., high resolution) by processing the first media data via the at least one AI model.

The term MRF 1402 may also be referred to as an entity for MRF or an MRF entity.

A method performed by a user equipment (UE) in a wireless communication system is provided. The method comprises receiving, from a media resource function (MRF) entity, a session description protocol (SDP) offer comprising a list of artificial intelligence (AI) models for outputting results used for media services, identifying at least one AI model, from the list, for outputting at least one result using first media data, based on a type of the first media data and a media service in which the at least one result is used, transmitting, to the MRF entity, an SDP response for requesting the at least one AI model as a response to the SDP offer and processing the first media data based on the at least one AI model received from the MRF entity.

The at least one AI model for outputting the at least one result is identified based on a UE capability for an AI model and network resources for the at least one AI model.

The SDP offer comprises information for grouping at least one AI data stream in which the at least one AI model is received and at least one media data stream in which the first media data is received and the at least AI data stream and the at least one media data stream are synchronized in time.

The processing of the first media data based on the at least one AI model comprises receiving, from the MRF entity, intermediate data that is based on the first media data and processing the intermediate data based on the at least one AI model received from the MRF entity, and the at least one result includes at least one of object recognition, increasing resolution, or language translation.

The method further comprises in case that the AI models of the SDP offer are not mapped with the type of the first media data and the media service, identifying a first AI model stored in the UE and mapped with the type of the first media data and the media service and processing the first media data based on the first AI model.

A user equipment (UE) in a wireless communication system is provided. The UE comprises a transceiver and a controller coupled with the transceiver and configured to receive, from a media resource function (MRF) entity, a session description protocol (SDP) offer comprising a list of artificial intelligence (AI) models for outputting results used for media services, identify at least one AI model, from the list, for outputting at least one result using first media data, based on a type of the first media data and a media service in which the at least one result is used, transmit, to the MRF entity, an SDP response for requesting the at least one AI model as a response to the SDP offer, and process the first media data based on the at least one AI model received from the MRF entity.

The at least one AI model for outputting the at least one result is identified based on a UE capability for an AI model and network resources for the at least one AI model.

The SDP offer comprises information for grouping at least one AI data stream in which the at least one AI model is received and at least one media data stream in which the first media data is received and the at least AI data stream and the at least one media data stream are synchronized in time.

The controller is further configured to receive, from the MRF entity, intermediate data that is based on the first media data, and process the intermediate data based on the at least one AI model received from the MRF entity, and the at least one result includes at least one of object recognition, increasing resolution, or language translation.

The controller is further configured to in case that the AI models included in the SDP offer are not mapped with the type of the first media data and the media service, identify a first AI model stored in the UE and mapped with the type of the first media data and the media service, and process the first media data based on the first AI model.

A method performed by a media resource function (MRF) entity in a wireless communication system is provided. The method comprises transmitting, to a user equipment (UE), a session description protocol (SDP) offer comprising a list of artificial intelligence (AI) models for outputting results used for media services and receiving, from the UE, an SDP response for requesting at least one AI model, from the list, for outputting at least one result using first media data, as a response to the SDP offer. The at least one AI model is based on a type of the first media data and a media service in which the at least one result is used.

The at least one AI model for outputting the at least one result is based on a UE capability for an AI model and network resources for the at least one AI model.

The SDP offer comprises information for grouping at least one AI data stream in which the at least one AI model is transmitted and at least one media data stream in which the first media data is transmitted and the at least AI data stream and the at least one media data stream are synchronized in time.

The method further comprises processing the first media data into intermediate data based on an AI model stored in the MRF entity, and mapped with the type of the first media data and the media service and transmitting, to the UE, the intermediate data in at least one media data stream.

The at least one result includes at least one of object recognition, increasing resolution, or language translation and wherein the first media data includes at least one of audio data or video data.

A media resource function (MRF) entity in a wireless communication system is provided. The MRF entity comprises a transceiver and a controller coupled with the transceiver and configured to transmit, to a user equipment (UE), a session description protocol (SDP) offer including a list of artificial intelligence (AI) models for outputting results used for media services, and receive, from the UE, an SDP response for requesting at least one AI model, from the list, for outputting at least one result using first media data, as a response to the SDP offer. The at least one AI model is based on a type of the first media data and a media service in which the at least one result is used.

The at least one AI model for outputting the at least one result is based on a UE capability for an AI model and network resources for the at least one AI model.

The SDP offer includes information for grouping at least one AI data stream in which the at least one AI model is transmitted and at least one media data stream in which the first media data is transmitted; and the at least AI data stream and the at least one media data stream are synchronized in time.

The controller is further configured to process the first media data into intermediate data based on an AI model stored in the MRF entity, and mapped with the type of the first media data and the media service, and transmit, to the UE, the intermediate data in at least one media data stream, The at least one result includes at least one of object recognition, increasing resolution, or language translation, and the first media data comprises at least one of audio data or video data.

Figure 15:
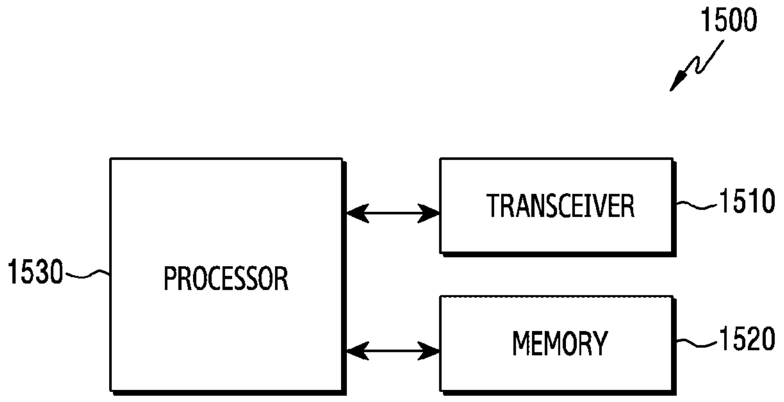
FIG. 15 is a diagram illustrating a structure of a base station, according to an embodiment.

FIG. 15 is a diagram illustrating a structure of a base station, according to an embodiment.

Referring to FIG. 15, a base station 1500 includes a transceiver 1510, a memory 1520, and a processor 1530. The transceiver 1510, the memory 1520, and the processor 1530 of the base station may operate according to a communication method of the base station described above. However, the components of the base station are not limited thereto. For example, the base station may include more or fewer components than those described above. In addition, the processor 1530, the transceiver 1510, and the memory 1520 may be implemented as a single chip. Also, the processor 1530 may include at least one processor. Furthermore, the base station 1500 of FIG. 15 corresponds to base station of FIG. 1 to FIG. 14.

The transceiver 1510 collectively refers to a base station receiver and a base station transmitter, and may transmit/receive a signal to/from a UE or a network entity. The signal transmitted or received to or from the terminal or a network entity may include control information and data. The transceiver 1510 may include a RF transmitter for up-converting and amplifying a frequency of a transmitted signal, and a RF receiver for amplifying low-noise and down-converting a frequency of a received signal. However, this is only an example of the transceiver 1510 and components of the transceiver 1510 are not limited to the RF transmitter and the RF receiver.

The transceiver 1510 may receive and output, to the processor 1530, a signal through a wireless channel, and transmit a signal output from the processor 1530 through the wireless channel.

The memory 1520 may store a program and data required for operations of the base station. The memory 1520 may store control information or data included in a signal obtained by the base station. The memory 1520 may be a storage medium, such as read-only memory (ROM), random access memory (RAM), a hard disk, a compact disc (CD)-ROM, and a digital versatile disc (DVD), or a combination of storage media.

The processor 1530 may control a series of processes such that the base station operates as described above. For example, the transceiver 1510 may receive a data signal including a control signal transmitted by the terminal, and the processor 1530 may determine a result of receiving the control signal and the data signal transmitted by the terminal.

Figure 16:
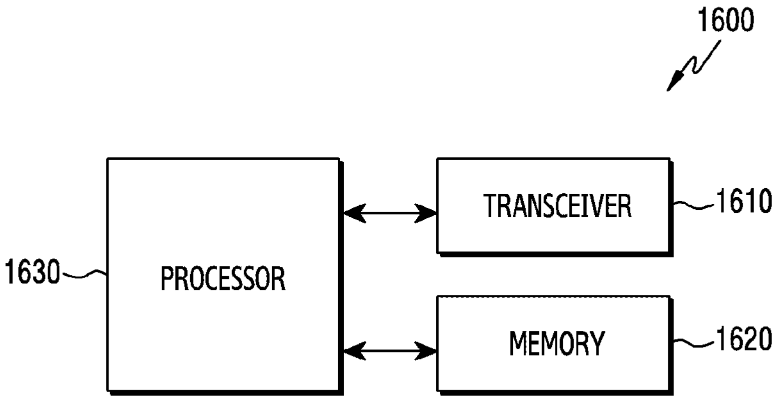
FIG. 16 is a diagram illustrating a structure of a network entity, according to an embodiment.

FIG. 16 is a diagram illustrating a structure of a network entity, according to an embodiment.

Referring to FIG. 16, a network entity 1600 includes a transceiver 1610, a memory 1620, and a processor 1630. The transceiver 1610, the memory 1620, and the processor 1630 of the network entity may operate according to a communication method of the network entity described above. However, the components of the terminal are not limited thereto. For example, the network entity may include more or fewer components than those described above. In addition, the processor 1630, the transceiver 1610, and the memory 1620 may be implemented as a single chip. Also, the processor 1630 may include at least one processor.

For example, the network entity 1600 of FIG. 16 corresponds to the MRF of FIG. 1 to FIG. 15.

The transceiver 1610 collectively refers to a network entity receiver and a network entity transmitter, and may transmit/receive a signal to/from a base station or a UE. The signal transmitted or received to or from the base station or the UE may include control information and data. In this regard, the transceiver 1610 may include a RF transmitter for up-converting and amplifying a frequency of a transmitted signal, and a RF receiver for amplifying low-noise and down-converting a frequency of a received signal. However, this is only an example of the transceiver 1610 and components of the transceiver 1610 are not limited to the RF transmitter and the RF receiver.

The transceiver 1610 may receive and output, to the processor 1630, a signal through a wireless channel, and transmit a signal output from the processor 1630 through the wireless channel.

The memory 1620 may store a program and data required for operations of the network entity. Also, the memory 1620 may store control information or data included in a signal obtained by the network entity. The memory 1620 may be a storage medium, such as ROM, RAM, a hard disk, a CD-ROM, and a DVD, or a combination of storage media.

The processor 1630 may control a series of processes such that the network entity operates as described above. For example, the transceiver 1610 may receive a data signal including a control signal, and the processor 1630 may determine a result of receiving the data signal.

Figure 17:
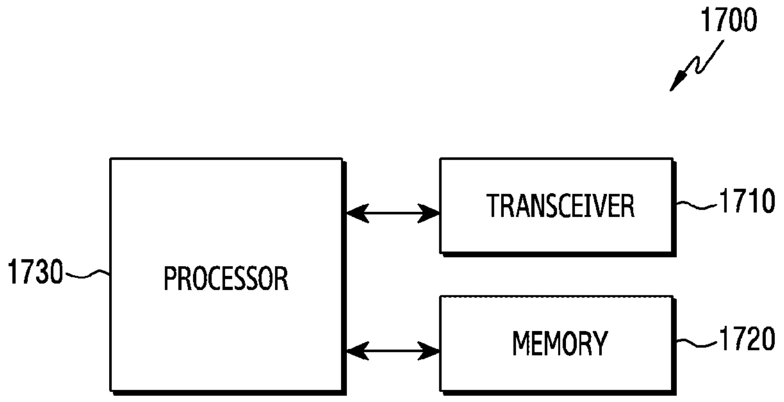
FIG. 17 is a diagram illustrating a structure of a UE, according to an embodiment.

FIG. 17 is a diagram illustrating a structure of a UE, according to an embodiment.

Referring to FIG. 17, a UE 1700 includes a transceiver 1710, a memory 1720, and a processor 1730. The transceiver 1710, the memory 1720, and the processor 1730 of the UE may operate according to a communication method of the UE described above. However, the components of the UE are not limited thereto. For example, the UE may include more or fewer components than those described above. In addition, the processor 1730, the transceiver 1710, and the memory 1720 may be implemented as a single chip, and the processor 1730 may include at least one processor.

The UE 1700 of FIG. 17 corresponds to the UE or terminal of FIG. 1 to FIG. 16.

The transceiver 1710 collectively refers to a UE receiver and a UE transmitter, and may transmit/receive a signal to/from a base station or a network entity, where the signal may include control information and data. The transceiver 1710 may include a RF transmitter for up-converting and amplifying a frequency of a transmitted signal, and a RF receiver for amplifying low-noise and down-converting a frequency of a received signal. However, this is only an example of the transceiver 1710 and components of the transceiver 1710 are not limited to the RF transmitter and the RF receiver.

The transceiver 1710 may receive and output, to the processor 1730, a signal through a wireless channel, and transmit a signal output from the processor 1730 through the wireless channel.

The memory 1720 may store a program and data required for operations of the UE. Also, the memory 1720 may store control information or data included in a signal obtained by the UE. The memory 1720 may be a storage medium, such as ROM, RAM, a hard disk, a CD-ROM, and a DVD, or a combination of storage media.

The processor 1730 may control a series of processes such that the UE operates as described above. For example, the transceiver 1710 may receive a data signal including a control signal transmitted by the base station or the network entity, and the processor 1730 may determine a result of receiving the control signal and the data signal transmitted by the base station or the network entity.

Various embodiments of the disclosure have been described above. The above description of the disclosure is merely for the sake of illustration, and embodiments of the disclosure are not limited to the embodiments set forth herein. Those skilled in the art will appreciate that the disclosure may be easily modified and changed into other specific forms without departing from the technical idea or essential features of the disclosure. Therefore, the scope of the disclosure should be determined not by the above detailed description but by the appended claims, and all modification sand changes derived from the meaning and scope of the claims and equivalents thereof shall be construed as falling within the scope of the disclosure.

What is claimed is:

1. A method performed by a user equipment (UE), the method comprising:

receiving, from a media resource function (MRF) entity, a session description protocol (SDP) offer comprising a list of artificial intelligence (AI) models for media services;

identifying media data for a media service among the media services;

identifying whether an AI model mapped with the media data among the list of the AI models is stored in the UE;

in response to the AI model not being stored in the UE, transmitting, to the MRF entity, an SDP response for requesting the AI model as a response to the SDP offer;

receiving, from the MRF entity, intermediate media data associated with the AI model of the MRF entity via a media data stream, and the AI model via an AI data stream; and processing the intermediate media data using the AI model, wherein, in response to the AI model being stored in the UE, the intermediate media data is processed using the AI model stored in the UE.

2. The method of claim 1, wherein the AI model is identified based on a UE capability for at least one AI model and network resources for the at least one AI model.

3. The method of claim 1, wherein the SDP offer comprises information for grouping at least one AI data stream in which at least one AI model is received and at least one media data stream in which media data is received, and wherein the at least one AI data stream and the at least one media data stream are synchronized in time.

4. The method of claim 1, wherein the AI model of the UE is configured to output at least one result by processing the intermediate media data, and wherein the at least one result includes at least one of object recognition, increasing resolution, or language translation.

5. The method of claim 1, further comprising:

when the AI model does not exist in the AI models of the SDP offer, identifying an additional AI model stored in the UE and mapped with the media data; and processing the media data based on the additional AI model.

6. A user equipment (UE) comprising:

at least one transceiver;

at least one processor communicatively coupled to the at least one transceiver; and at least one memory, communicatively coupled to the at least one processor, storing instructions executable by the at least one processor individually or in any combination to cause the UE to:

receive, from a media resource function (MRF) entity, a session description protocol (SDP) offer comprising a list of artificial intelligence (AI) models for media services, identify media data for a media service among the media services, identify whether an AI model mapped with the media data among the list of the AI models is stored in the UE, in case that the AI model is not stored in the UE, transmit, to the MRF entity, an SDP response for requesting the AI model as a response to the SDP offer, receive, from the MRF entity, intermediate media data associated with the AI model of the MRF entity via a media data stream, and the AI model via an AI data stream, and process the intermediate media data using the AI model, wherein, in case that the AI model is stored in the UE, the intermediate media data is processed using the AI model stored in the UE.

7. The UE of claim 6, wherein the AI model is identified based on a UE capability for at least one AI model and network resources for the at least one AI model.

8. The UE of claim 6, wherein the SDP offer comprises information for grouping at least one AI data stream in which at least one AI model is received and at least one media data stream in which media data is received; and wherein the at least one AI data stream and the at least one media data stream are synchronized in time.

9. The UE of claim 6, wherein the AI model of the UE is configured to output at least one result by processing the intermediate media data, and wherein the at least one result includes at least one of object recognition, increasing resolution, or language translation.

10. The UE of claim 6, wherein the instructions further cause the UE to:

when the AI model does not exist in the AI models, identify an additional AI model stored in the UE and mapped with the media data stream, and process the media data based on the additional AI model.

11. A method performed by a media resource function (MRF) entity, the method comprising:

transmitting, to a user equipment (UE), a session description protocol (SDP) offer comprising a list of artificial intelligence (AI) models for media services;

in response to an AI model not being stored in the UE, receiving, from the UE, an SDP response for requesting the AI model mapped with a media data among the list of the AI models as a response to the SDP offer, wherein the media data is for a media service among the media services;

generating intermediate media data using the AI model of the MRF entity; and transmitting, to the UE, the intermediate media data for the AI model via a media data stream, and the AI model via an AI data stream, wherein, in response to the AI model being stored in the UE, a processing of the intermediate media data is based on the AI model stored in the UE.

12. The method of claim 11, wherein the AI model is based on a UE capability for at least one AI model and network resources for the at least one AI model.

13. The method of claim 11, wherein the SDP offer comprises information for grouping at least one AI data stream in which at least one AI model is transmitted and at least one media data stream in which media data is transmitted, and wherein the at least one AI data stream and the at least one media data stream are synchronized in time.

14. The method of claim 11, wherein the AI model is mapped with a type of the media data and a type of the media service.

15. The method of claim 11, wherein the AI model is configured to output at least one result by processing the intermediate media data, wherein the at least one result includes at least one of object recognition, increasing resolution, or language translation, and wherein the media data includes at least one of audio data or video data.

16. A media resource function (MRF) entity comprising:

at least one processor; and at least one memory, communicatively coupled to the at least one processor, storing instructions executable by the at least one processor individually or in any combination to cause the MRF entity to:

transmit, to a user equipment (UE), a session description protocol (SDP) offer including a list of artificial intelligence (AI) models for media services, in response to an AI model not being stored in the UE, receive, from the UE, an SDP response for requesting the AI model mapped with a media data among the list of the AI models as a response to the SDP offer, wherein the media data is for a media service among the media services, generate intermediate media data using the AI model of the MRF entity, and transmit, to the UE, the intermediate media data for the AI model via a media data stream, and the AI model via an AI data stream, wherein, in response to the AI model being stored in the UE, a processing of the intermediate media data is based on the AI model stored in the UE.

17. The MRF entity of claim 16, wherein the AI model is based on a UE capability for at least one AI model and network resources for the at least one AI model.

18. The MRF entity of claim 16, wherein the SDP offer includes information for grouping at least one AI data stream in which at least one AI model is transmitted and at least one media data stream in which media data is transmitted, and wherein the at least one AI data stream and the at least one media data stream are synchronized in time.

19. The MRF entity of claim 16, wherein the AI model is mapped with the media data and a type of the media service.

20. The MRF entity of claim 16, wherein the AI model is configured to output at least one result by processing the intermediate media data, wherein the at least one result includes at least one of object recognition, increasing resolution, or language translation, and wherein the media data comprises at least one of audio data or video data.

* * * * *